United States Patent [19]

Zvanut et al.

[11] 4,005,309

[45] Jan. 25, 1977

[54] FABRICATED WELDING WIRE FOR CORROSIVE-RESISTANT STAINLESS

[75] Inventors: Albert J. Zvanut, Whittier, Calif.; Masahiro Nakabayashi, Ashtabula, Ohio

[73] Assignee: Stoody Company, Industry, Calif.

[22] Filed: Mar. 21, 1975

[21] Appl. No.: 560,849

Related U.S. Application Data

[63] Continuation of Ser. No. 402,440, Oct. 1, 1973, abandoned.

[52] U.S. Cl. .................... 219/146; 219/137 WM
[51] Int. Cl.² ................................. B23K 35/22
[58] Field of Search ........ 219/73, 74, 75, 137 WM, 219/145, 146; 148/24, 26

[56] References Cited

UNITED STATES PATENTS

| | | | |
|---|---|---|---|
| 3,033,977 | 5/1962 | Quaas | 219/146 |
| 3,476,909 | 11/1969 | Kameda et al. | 219/146 X |
| 3,513,289 | 5/1970 | Blake | 219/146 |
| 3,518,404 | 6/1970 | ter Haar | 219/146 |
| 3,581,054 | 5/1971 | Bjorkroth | 219/146 |
| 3,645,782 | 2/1972 | Johnson | 219/146 X |

*Primary Examiner*—Bruce A. Reynolds
*Assistant Examiner*—N. D. Herkamp
*Attorney, Agent, or Firm*—Nilsson, Robbins, Dalgarn & Berliner

[57] ABSTRACT

A fabricated electrode is disclosed in the form of an elongated or continuous metallic sheath, composed for example of cold-rolled mild steel, and containing specific components somewhat uniformly distributed along its length, and for use in shielded-arc welding. Specifically, the composite provides a stainless steel and includes: a major percentage of iron; a limited amount, however, at least about 09.00 percent by weight of alloying metal, e.g. chromium; from about 0.01 to about 0.08 percent by weight of carbon and further including titanium in an unconventionally large amount of at least about six times the percentage by weight of the carbon in the composite. Advantages are disclosed for the provision of the titanium in the form of ferrotitanium, and the chromium in the form of ferrochromium, a major portion of which has a small particle size. Also as disclosed, the composite further includes deoxidizing agents, e.g. manganese and silicon.

7 Claims, No Drawings

FABRICATED WELDING WIRE FOR CORROSIVE-RESISTANT STAINLESS

This is a continuation of application Ser. No. 402,440, filed Oct. 1, 1973, now abandoned.

BACKGROUND AND SUMMARY OF THE INVENTION

From time to time the need arises for a welding wire or continuous arc electrode that is usable to weld alloys having rather specific characteristics. The situation is exemplified by a need that existed in relation to catalytic converters for automotive use and other high temperature anti-pollution devices. Specifically, proposals have been made to reduce the volume of air pollutants from automotive engines by catalytic converters that process the engine exhaust stream. One of the difficulties encountered in the course of developing a commercially practical catalytic converter relates to the highly-corrosive nature of the exhaust stream. A solution to that problem involves the use of corrosive-resistant, though relatively inexpensive stainless steel alloys, notably Type 409M stainless steel.

Although Type 409M stainless steel is very resistant to corrosion, and relatively inexpensive, it also is substantially nonductile. Consequently, the use of the material in fabricated structures has previously been quite limited and efforts to draw welding wire for the material presents considerable problems. Specifically, forming welding wire from such alloys directly is not feasible because the material is not sufficiently ductile to be drawn. That is, a billet of 409M stainless steel would require formation into a wire for effective use in arc welding processes. The problems attendant forming a billet of such alloy into a usable wire are strongly compelling against pursuing such a process.

The difficulty of forming welding wires, as from billets of 409M stainless, suggested the possibility of fabricating wire electrodes. Accordingly, wires were fabricated to contain components of an alloy as would be expected to form a satisfactory weld. However, repeated tests with such wires have been unsatisfactory. Substantial efforts to maintain the weld of sufficient strength, and outside the gamma loop (region of hardening), generally have been successful only with wires of relatively very high cost.

In general, the present invention is directed to an economical wire and process for effectively welding 409M stainless steel, which wire is in the form of a fabricated electrode, e.g. metallic strip formed into a sheath so as to enclose other desirable components for the composite wire. A characteristic of the fabricated wire of the present invention is that it forms a weld deposit that falls outside the gamma loop while containing a practical quantity of carbon for strength. The wire is attained, recognizing the economic significance of using relatively low (under 14% or 15% by weight) quantities of chrome. In the combination of components as defined and considered below, the need was discovered for an unconventionally very-large quantity of titanium to produce an electrode that may be effectively employed in gas-shielded arc welding.

DESCRIPTION OF THE ILLUSTRATIVE EMBODIMENT

As required, detailed illustrative embodiments of the invention are disclosed herein serving in that regard as the best modes presently contemplated. The embodiments exemplify the invention which may, of course, be constructed in various other forms, some of which may be radically different from those disclosed herein. However, the specific details disclosed are representative and provide a basis for the claims which define the scope of the present invention.

Further in the above regard, it is noteworthy that welding electrode or wire in accordance herewith can be fabricated by any of several well known and commercially-employed processes. Essentially, the fabrication involves enclosing a core of selected particulate materials in a metal sheath so that the core is effectively contained and isolated. The basic production techniques involved in such fabrication are disclosed, for example, in U.S. Pat. Nos. 1,629,748 and 1,640,859, issued to W. F. Stoody. However, the fabrication process has been the subject of many refinements and as indicated above is well known so that further detailed description herein is neither deemed appropriate nor necessary. It is pertinent that advantages result from the use of cold-rolled mild steel in the fabrication of wire in accordance with the present invention. The advantages include: economy, ease of fabrication and the availability of such material.

The metallic components of electrodes as disclosed and considered herein are normally obtained from both the sheath material and the particulate or pulverized metals and alloys contained therein. As suggested above, mild steel, e.g. having a maximum carbon content of 0.10 percent by weight, is accommodating as a sheath for the contents of the composite electrode. Of course, it is recognized that a wire may be fabricated in accordance with the present developments, using sheaths of various other metals or alloys.

With regard to another component of the wire, the quantity of chrome has been determined to be at an effective though economic amount at between about 10.0 and 14.0 percent by weight. In that regard, distinct advantages are recognized for the use of ferrochromium in the composite electrode. Specifically, ferrochromium is relatively easy to crush to a fine particle size and it has been found desirable to reduce the major portion of the core to particles that are no larger than 40 mesh size. Furthermore, the use of ferro-chrome affords effective distribution of the chrome throughout the core. That is, as the chrome is somewhat-less concentrated by its presence in ferrochrome, a more uniform distribution of chrome throughout the core is accomplished in the fabricated wire.

In relation to the titanium present in the wire, it is to be recognized that pure titanium is unstable and rather difficult to handle. By using ferrotitanium to provide the requisite titanium in the composite, handling is simplified, greater quantities are recovered in the deposit, and the uniformity of distribution is also improved. Of course, in view of the lesser quantity of titanium in the composite, improved distribution and greater uniformity is perhaps even of greater significance than in the case of the chrome. In general, it has been found desirable to utilize a ferro-titanium which contains not more than 80 percent titanium.

Wires formed in accordance herewith may be effectively employed as consumable electrodes in gas-shielded arc-welding processes. That is, the electrode is electrically energized to provide an arc and as the electrode enters the electric arc, from which a weld deposit is formed, the arc is shielded by gas, e.g. argon or helium, to limit oxidation therein substantially as described in the WELDING HANDBOOK (Section Two) entitled Welding Processes, Fifth Edition, published by American Welding Society, 1963.

Other details, objects, characteristics and advantages of welding wires constructed in accordance with the present invention will become apparent in view of the following description of certain specific embodiments.

EXAMPLE 1

In considering a formulation for arc welding 409M stainless, it was determined that a significant amount of carbon was required for adequate strength, e.g. at least 0.01% by weight. However, significant amounts of carbon tended to result in a non-ferritic weld deposit. The addition of conventional amounts of titanium, e.g. up to four times the quantity of the carbon present were not effective to accomplish a ferritic deposit. Wires of high chromium content were suggested; however, economic considerations urge against such formulations.

Ultimately, it was discovered that an unconventionally large quantity of titanium was required to attain the desired characteristics for the deposit. It is theorized that the need for such quantities of titanium arises due to titanium loss in crossing the arc of a fabricated rod. That is, as the fabricated rod contains some air (containing oxygen) as well perhaps as some spurious oxides, the titanium oxidizes regardless of the effectiveness of any shield, e.g. gas enclosure.

On the basis of tests, subsequent to the discovery of a need for an unconventionally large quantity of titanium, a welding wire or electrode for welding 409M stainless steel was fabricated using a low-carbon (0.10 maximum) mild steel strip as a sheath. The sheath comprised about 78.8 percent by weight of any given length of the wire. That is, the wire was formulated to have a substantially-uniform composition over any length of reasonable size and the sheath comprised about 78.8 percent by weight of the length.

The core contained within the space defined by the sheath included: ferrochromium 16.5 percent by weight (70 percent chrome content); ferrotitanium 3.2 percent by weight (30 percent titanium); ferrosilicon 0.9 percent by weight and manganese metal 0.6 percent by weight.

The component ingredients of the core were provided in a particle form with the major amount thereof being reduced to particle sizes not larger than 40 mesh. Within the capability of current commercial production techniques, the core ingredients then were uniformly distributed within the sheath in accordance with the percentages set forth above.

In operation, the wire was effective to arc weld (argon shielded) 409M stainless steel, producing a weld having an analysis substantially similar to the base metal. Welds accomplished with the wire were effective and of good quality, having good strength and no apparent cracks or defects.

EXAMPLE 2

Wires substantially as set forth above also were formulated with variations in the amount of carbon. In that regard, several wires were formulated, in which the amount of titanium present was at least six times the quantity of the carbon present but not over 3% of the wire, in each case on the basis of weight. Each such wire was effective for use in arc welding 409M stainless with a gaseous shield as known.

It is to be recognized that an amount of titanium equal to only six times the amount of carbon (by weight) involves a very-tightly packed wire, containing very little air or spurious oxides. For wires of increased oxygen content, an increased quantity of titanium will be necessary to obtain an effective ferritic weld deposit. Although relatively high quantities of titanium are usable, of course, economic considerations favor the use of minimally-effective quantities.

EXAMPLE 3

Finally, experiments were undertaken to formulate the practical and effective limits for component ingredients of the electrode. In that regard, several wires were fabricated and tested and the economic aspects were analyzed. As a consequence, the following is set forth as defining ranges for each ingredient to obtain a commercial welding wire or electrode in accordance herewith that may be successfully used in gas-shielded arc welding processes to weld 409M stainless. Specifically:

| Ingredient | Percentage by Weight |
| --- | --- |
| carbon | between about 0.01 and 0.08 |
| manganese | between about 0.40 and 1.00 |
| chromium | between 09.0 and 14.0 |
| silicon | between about 0.4 and 1.0 |
| titanium | at least six times the weight percentage of carbon present |
| sulfur | up to 0.03 |
| phosphorus | up to 0.03 |
| iron | between about 73.55 and 89.50 |

In the defined ranges and as set forth above, iron is the major component. Carbon is present to afford the requisite strength and hardening. Manganese and silicon are present as deoxidizers or wetting agents for the welding operation in amounts that are somewhat characteristic. Chromium is present to accomplish the desired alloy yet is limited to an economic quantity. Titanium is present as considered above in detail.

As indicated above, electrodes formulated within these definitions have been determined to be economically feasible and to consistently produce effective welds on 409M stainless steel. Accordingly, these ranges afford the basis for the claims as set forth below to define the scope of the present invention.

What is claimed is:
1. An arc-welding electrode comprising:
  an elongated metallic sheath defining an internal space;
  particulate material in said space of said sheath;
  said sheath and said material in composite along the length of said sheath consisting essentially of a major percentage of iron, between about 9.0 and 14.0 percent by weight of chromium, from about 0.01 to about 0.08 percent by weight of carbon, an effective amount of deoxidizer material, up to 0.03 percent by weight each of sulfur and phosphorous, and further including titanium in the form of ferrotitanium having less than 80 percent by weight of titanium but an amount at least six times the percentage by weight of said carbon in said composite and not in excess of 3% by weight of said electrode, a major portion of said ferrotitanium being reduced to a size not larger than 40 mesh.
2. An electrode according to claim 1 wherein said chromium is present in the form of ferrochromium.

3. An electrode according to claim 1 further in which said deoxidizing material is in the form of manganese and silicon.

4. An electrode according to claim 3 wherein said silicon and manganese are each present in an amount of between about 0.40 and 01.00 percent by weight.

5. An electrode according to claim 1 wherein said metallic sheath comprises cold-rolled mild steel.

6. An electrode according to claim 5 in which said deoxidizing ingredients are in the form of manganese and silicon in which said silicon and manganese are each present in an amount of between about 0.40 and 01.00 percent by weight.

7. In a process for forming a stainless steel weld on a workpiece wherein an arc welding electrode is electronically energized to provide an arc between said welding electrode and said workpiece and wherein said arc is shielded with a gaseous shield to limit oxidation therein, said electrode consisting of an elongated mettalic sheath defining an internal space and particulate material in said space of said sheath, the improvement according to which sheath and said material in composite along the length of said sheath consists essentially of a major percentage of iron, between about 9.0 and 14.0 by weight of chromium, from about 0.01 to about 0.08 percent by weight of carbon, an effective amount of deoxidizer material, up to 0.03 percent by weight of sulfur and phosphorous, and further including titanium in the form of ferrotitanium having less than 80 percent by weight of titanium but an amount at least six times the percentage by weight of said carbon in said composite and not in excess of 3% by weight of said electrode, a major portion of said ferrotitanium being reduced to a size not larger than 40 mesh.

* * * * *